April 24, 1945.  C. K. EMDE ET AL  2,374,528
MILLING CUTTER
Filed Aug. 26, 1943
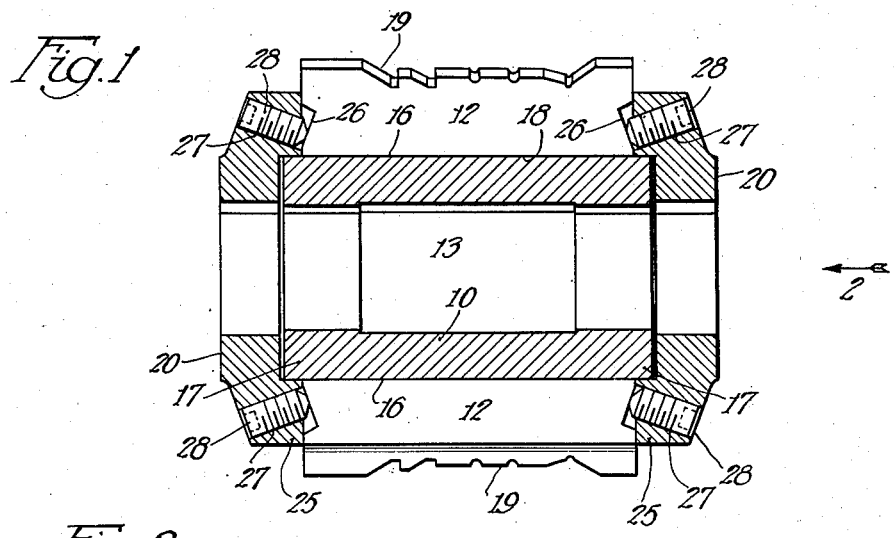
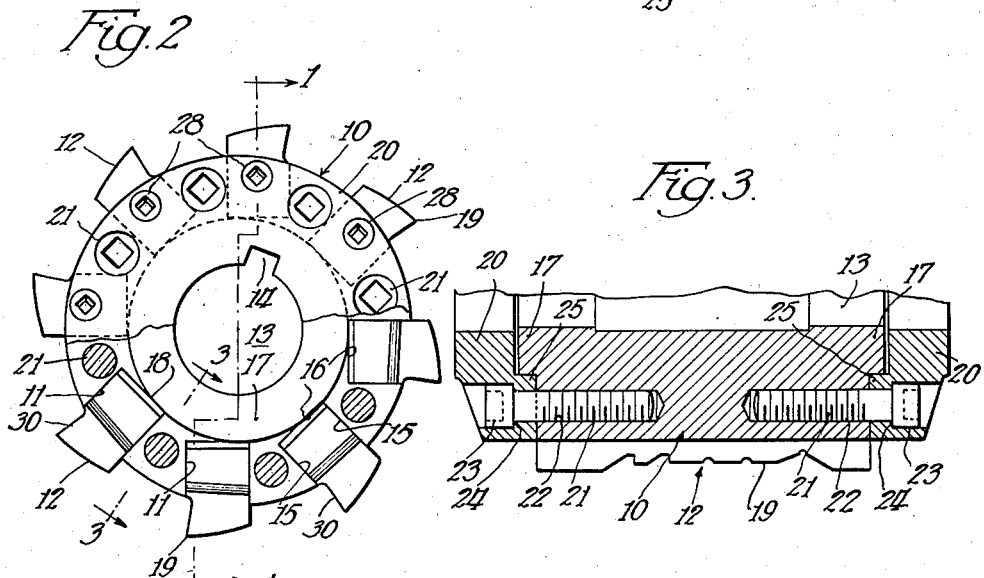
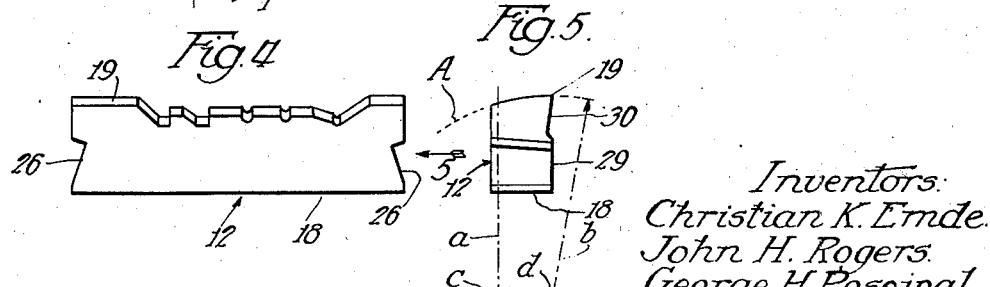
Witness:
V. Siljander
Inventors:
Christian K. Emde.
John H. Rogers.
George H. Posejpal
By Hiie & Hiie Attys.

Patented Apr. 24, 1945

2,374,528

UNITED STATES PATENT OFFICE 2,374,528

MILLING CUTTER

Christian K. Emde, John H. Rogers, and George H. Posejpal, Chicago, Ill.

Application August 26, 1943, Serial No. 500,056

4 Claims. (Cl. 29—105)

This invention relates to a milling cutter and more particularly it relates to a milling cutter having inserted, formed cutting blades or teeth for producing milled surfaces of predetermined configuration.

One of the objects of this invention is the production of an inserted cutting blade or tooth having a cutting edge of predetermined design for milling the surface of an object, the cutting edge of the blade or tooth being backed off by grinding the edge on an arcuate line eccentric with respect to the axis of the milling cutter, whereby greater accuracy in milling operations is obtained than with the cutting blades or teeth now in use.

Another object is to provide a milling cutter with a plurality of removable and replaceable and interchangeable cutting blades or teeth having cutting edges of desired configuration with the cutting edges backed off along arcuate lines that are eccentric with respect to the axis of the milling cutter.

Another object is to provide novel means for removably securing the cutting blades or teeth in the body of the milling cutter.

One embodiment of the invention is clearly illustrated in the accompanying drawing, in which:

Fig. 1 is a longitudinal section through the milling cutter taken on the line 1—1 of Fig. 2 and showing two of the cutting blades or teeth in side elevation;

Fig. 2 is an end elevation of the milling cutter looking in the direction of the arrow 2 in Fig. 1 and showing a certain cap partly broken away;

Fig. 3 is a longitudinal section taken on the line 3—3 of Fig. 2;

Fig. 4 is a detail side elevation of one of the inserted, formed cutting blades or teeth; and Fig. 5 is an end elevation thereof looking in the direction of the arrow 5 in Fig. 4.

Referring to said drawing which is merely illustrative of one form of the present invention, the reference character 10 designates the main body of the milling cutter, which is generally cylindrical in form having a plurality of grooves 11 formed in its cylindrical face for the reception of inserted, formed cutting blades or teeth 12. The body is formed with an axial bore or hole 13 for the reception of a spindle (not shown) upon which the milling cutter is rigidly mounted when in use. Desirably a keyway 14 is formed on the face of the bore for the reception of a key (not shown).

The grooves are straight and extend parallel with the axis of the body. The sides 15 of the grooves are straight and parallel and extend inward from the cylindrical face of the body and the bottoms 16 of the grooves are straight and extend at right angles to the sides 15—15.

The cutting blades or teeth are slightly shorter than the overall length of the body and the ends of the body between its cylindrical face and the bottoms of the grooves are machined away to leave annular flanges 17 that project beyond the ends of the cutting blades or teeth. The cutting blades or teeth fit in the grooves with their inner edges 18 seated on the bottoms 16 of the grooves and their cutting edges 19 disposed beyond the cylindrical face of the body.

Ring-like caps 20 are secured upon the end faces of the body by screws 21 threadedly engaged in threaded bores 22 that extend inwardly from the end faces of the body on axes that are parallel with the axis of the body. The heads 23 of the screws 21 bear against shoulders 24 formed in the screw holes in the caps. The caps are formed with annular flanges 25 that surround the flanges 17 of the body and bear against the ends of the cutting blades or teeth.

Means are provided for seating the cutting blades or teeth on the bottoms of the grooves in the head and the means shown is as follows:

The end edges of each cutter blade or tooth is machined so as to incline inwardly from a point adjacent the bottom edge 18 of the cutter blade or tooth as shown at 26 and screw holes 27 are drilled in the caps 20 at right angles to the inclined edges 26 of the cutter blades or teeth at places intermediate the ends of said inclined edges. The holes 27 are tapped to provide internal screw threads, and screws 28 are threadedly engaged with said threads of the screw holes 27 and are tightly screwed down upon the inclined edges 26 of the cutting blades or teeth thereby tightly seating the cutting blades or teeth upon the bottoms 16 of the grooves 11. Conveniently the screws 21, 28 may be formed with many-sided sockets in their outer ends for the application of a tool.

The cutting faces or leading faces of the cutting blades or teeth are formed by machining or grinding away part of the material on a suitable slight angle to the side face 29 of the cutting blade or tooth so as to provide sloping or set-back faces 30 (see Fig. 5). The cutting edge 19 of each cutting blade or tooth is ground to impart the desired configuration to the cutting edge and in grinding said edge, the outer surface of the blade or tooth is backed off on an arcuate line which is eccentric with respect to the axis of the body of the milling cutter so as to provide efficient clearance. The arcuate line of the cutting edge is illustrated by the dotted A, line in Fig. 5, in which the reference character, a, designates a radial line running from the axis, c, of the body of the milling cutter and, b, designates the radius for the arcuate line A and radiates from a point, d, which is spaced away from the axis, c, and at right angles to the radial line a. The cutting blade or tooth is backed off along the arcuate line A struck from the center d. In grinding the cutting edge 19, the configuration of said cutting edge is maintained from front to back of the cutting blade or tooth so that the identical configuration of the cutting edge is accurately preserved in case it becomes necessary to sharpen the cutting blade or tooth, which is done by grinding back the sloping face 30 thereof.

The milling cutter may be made in various sizes as required and several sets of cutting blades or teeth may be furnished with each milling cutter, those of each set having identical cutting edges of predetermined design. With the use of interchangeable cutting blades or teeth the milling cutter is capable of performing milling operations of various designs.

One of the advantages of the present invention is that the body portion of the milling cutter may be made from less costly metal than the blades or teeth. Desirably the latter are constructed of steel alloy, which may be of the "high speed" steel type.

Having thus described our invention, it is obvious that various immaterial modifications may be made in the same without departing from the spirit of our invention; hence we do not wish to be understood as limiting ourselves to the exact form, construction, arrangement and combination of parts herein shown and described, or uses mentioned.

What we claim as new and desire to secure by Letters Patent is:

1. In a milling cutter the combination of a body of cylindrical form having a plurality of grooves extending inward from its cylindrical face along lines parallel with the axis of the body, inserted, formed cutting blades or teeth having identical irregular ground cutting edges backed off to provide clearance along arcs of circles eccentrically disposed with respect to the axis of the body, caps secured upon the ends of the body and set screws threadedly mounted in said caps and impinging upon the ends of the blades or teeth, said set screws extending in lines that are oblique with respect to the axis of the body whereby to seat the blades or teeth on the bottoms of the grooves.

2. In a milling cutter the combination of a body of cylindrical form having a plurality of grooves extending inward from its cylindrical face along lines parallel with the axis of the body, inserted, formed cutting blades or teeth having identical irregular ground cutting edges, backed off to provide clearance along arcs of circles eccentrically disposed with respect to the axis of the body, the ends of the blades or teeth being formed with inwardly inclined end edges, caps secured upon the ends of the body and set screws threadedly mounted in said caps and impinging upon the inclined end edges of the blades or teeth, said screws extending at right angles to said inclined end edges.

3. In a milling cutter the combination of a body of cylindrical form having a plurality of grooves extending inward from its cylindrical face along lines parallel with the axis of the body, said body being formed with an annular flange projecting beyond the end faces of the grooved portion of the body, inserted, formed cutting blades or teeth having similar irregular ground cutting edges, backed off to provide clearance along arcs of circles eccentrically disposed with respect to the axis of the body, caps on the ends of the body having annular flanges surrounding the flanges of the body, screws for securing said caps on the body, and set screws threadedly mounted in said caps on axes that are inclined with respect to the axis of the body and impinging upon inwardly inclined end edges of the blades or teeth whereby to seat said blades or teeth on the bottoms of the grooves.

4. In a milling cutter the combination of a body of cylindrical form having a plurality of grooves extending inward from its cylindrical face along lines parallel with the axis of the body, said body being formed with an annular flange projecting beyond the end faces of the grooved portion of the body, inserted, formed cutting blades or teeth having similar irregular ground cutting edges, backed off to provide clearance along arcs of circles eccentrically disposed with respect to the axis of the body, said blades or teeth having inwardly inclined end edge portions, caps on the ends of the body having annular flanges surrounding the flanges of the body, screws for securing said caps on the body, and set screws threadedly mounted in said caps on axes that are inclined with respect to the axis of the body and impinging upon said inwardly inclined end edges of the blades or teeth whereby to seat the latter on the bottoms of the grooves.

CHRISTIAN K. EMDE.
JOHN H. ROGERS.
GEORGE H. POSEJPAL.